United States Patent
Song et al.

(10) Patent No.: US 9,294,550 B2
(45) Date of Patent: Mar. 22, 2016

(54) EFFICIENT DATA TRANSFER FOR CLOUD STORAGE BY CENTRALIZED MANAGEMENT OF ACCESS TOKENS

(71) Applicant: ZeroDesktop, Inc., San Mateo, CA (US)

(72) Inventors: Young G. Song, Palo Alto, CA (US); Richard Sah, San Mateo, CA (US); Moo Chan Song, San Mateo, CA (US); Frank C. Pesek, Oakland, CA (US)

(73) Assignee: ZERODESKTOP, INC., San Mateo, CA (US)

( * ) Notice: Subject to any disclaimer, the term of this patent is extended or adjusted under 35 U.S.C. 154(b) by 236 days.

(21) Appl. No.: 13/742,971

(22) Filed: Jan. 16, 2013

(65) Prior Publication Data
US 2013/0332575 A1 Dec. 12, 2013

Related U.S. Application Data

(60) Provisional application No. 61/658,099, filed on Jun. 11, 2012.

(51) Int. Cl.
G06F 15/16 (2006.01)
H04L 29/08 (2006.01)

(52) U.S. Cl.
CPC ............ *H04L 67/10* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 6,778,066 | B2* | 8/2004 | Smith | 340/5.61 |
| 8,392,543 | B1* | 3/2013 | Singh et al. | 709/221 |
| 2008/0134347 | A1* | 6/2008 | Goyal et al. | 726/29 |
| 2009/0300719 | A1* | 12/2009 | Ferris | 726/3 |
| 2011/0099616 | A1* | 4/2011 | Mazur et al. | 726/7 |
| 2011/0191838 | A1 | 8/2011 | Yanagihara | |
| 2011/0277003 | A1* | 11/2011 | Xiong | H04L 63/0807 725/104 |
| 2012/0079126 | A1 | 3/2012 | Evans et al. | |
| 2012/0096567 | A1 | 4/2012 | Ferris | |

FOREIGN PATENT DOCUMENTS

TW 201214139 A 4/2012

OTHER PUBLICATIONS

PCT International Search Report and Written Opinion, PCT Application No. PCT/US13/44156, Dec. 6, 2013, 13 pages.
Taiwan Office Action, Taiwan Application No. 102120578, Jan. 14, 2015, 20 pages.

* cited by examiner

*Primary Examiner* — Ruolei Zong
*Assistant Examiner* — Padma Mundur
(74) *Attorney, Agent, or Firm* — Fenwick & West LLP

(57) ABSTRACT

A data management server manages access tokens for accessing remote storage service servers. The data management server sends the access tokens to user terminals to enable the user terminals to communicate directly with the remote storage server to upload data to the remote storage service server or download data from the remote storage service server without routing of data traffic through the centralized data management server. The data management server initially communicates with a remote storage service server to open an account for a user and obtains an access token for accessing the account in the remote storage service server.

18 Claims, 6 Drawing Sheets

EFFICIENT DATA TRANSFER FOR CLOUD STORAGE BY CENTRALIZED MANAGEMENT OF ACCESS TOKENS

CROSS-REFERENCE TO RELATED APPLICATION

This application claims priority under 35 U.S.C. §119(e) to U.S. Provisional Patent Application No. 61/658,099, filed on Jun. 11, 2012, which is incorporated by reference herein in its entirety.

BACKGROUND OF THE INVENTION

1. Field of the Invention

This invention relates generally to transferring data to a cloud storage device, and more specifically to using a data management server to store and send access tokens for accessing cloud storage devices to the local user terminals.

2. Description of the Related Art

A user terminal may communicate with a dedicated cloud server to store and access data. FIG. 1A is a block diagram illustrating conventional architecture for storing and accessing data on a cloud service server 130 by a user terminal 114. The cloud service server 130 may service multiple user terminals 114, each having an account in the cloud service server 130. The user terminal 114 may be used by a user to upload data to or download data from the cloud service server 130 via network 110 (e.g., Internet).

However, the total amount of data that can be uploaded by a user may be restricted for various reasons. One of the reasons for such restriction is that cloud storage service providers typically offer a limited amount of free storage space per account. In order to mitigate the restrictions imposed by the cloud storage service providers, the user may create multiple free accounts with several cloud storage service providers, and thereby effectively increase the total amount of cloud storage available to the user.

In order to alleviate inconvenience associated with managing accounts for multiple cloud service servers 130, an aggregator server 120 may be used as illustrated in FIG. 1B. The aggregator service server 120 provides a single access connection point to several cloud storage service servers, synchronizing data to a designated folder on a designated user terminal 114. All upload and download synchronizing traffic pass through the aggregator server 120. For this purpose, the aggregator server 120 maintains access tokens for different cloud service services 130 and routes data between the user terminal 114 and the cloud service servers 130.

Although many cloud storage service providers provide dedicated synchronizing tools, each synchronizing tool is relevant only to certain cloud service servers 130. The user terminal 114 where local synchronization client software resides also requires provision of frequent two-way communications with the aggregator server 120 to compare index updates, upload data or download data for synchronization. For tablet and mobile devices, this method consumes additional battery life due to the frequent synchronization communications.

SUMMARY OF THE INVENTION

Embodiments relate to storing access information items corresponding to accounts of users in storage computing devices in a data management computing device and sending the access information items to the users to enable the users to access storage computing devices located remotely from the users. Each of the accounts enables each of the users to store data in a storage computing device or retrieve data from the storage computing device. The data management computing device retrieves the access information items corresponding to the accounts for each of the users in the plurality of storage computing devices, and sends the retrieved access information items to the users.

In one embodiment, user terminals of the users send data for storing directly to the storage computing devices or receive data for retrieval directly from the storage computing devices using the access information items without the sending data or the receiving data passing through the data management computing device.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE EMBODIMENTS

Figure 1A:
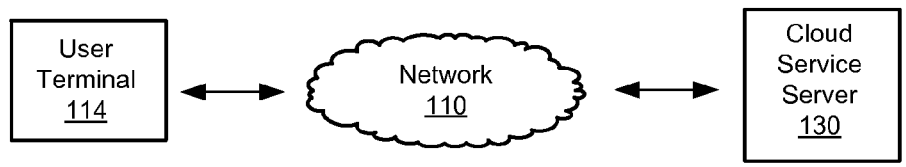
FIG. 1A is a block diagram illustrating the conventional architecture of a cloud storage system with a dedicated cloud service server.
Figure 1B:
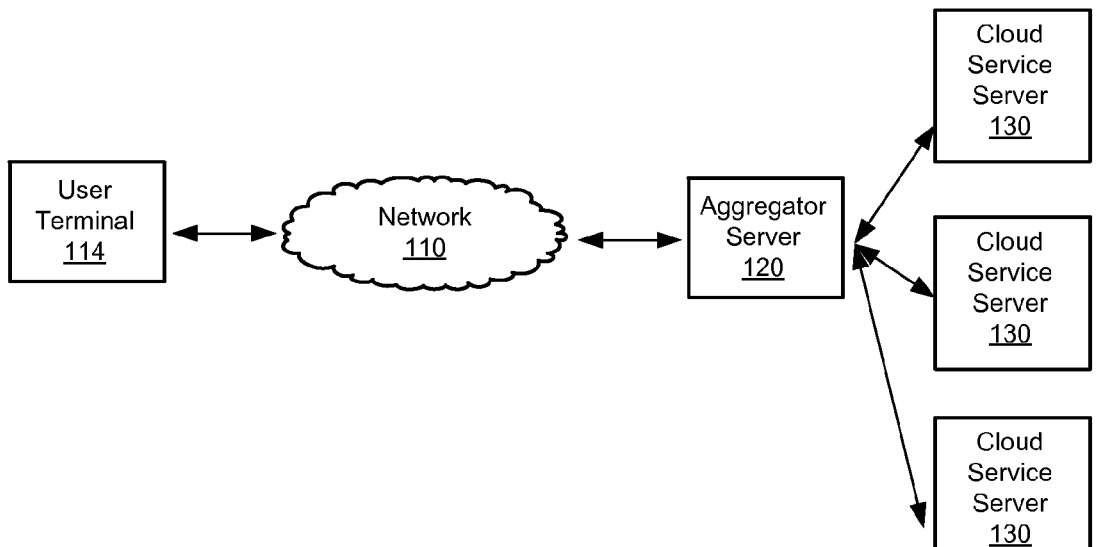
FIG. 1B is a block diagram illustrating the conventional architecture of a cloud storage system with multiple cloud service servers.

Reference in the specification to "one embodiment," "an embodiment" or "the embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, a personal digital assistant (PDA), a cellular telephone or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, flash memory or drives, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Embodiments relate to managing access tokens for accessing remote storage service servers at a centralized data management server and sending the access tokens to user terminals to enable the user terminals to communicate directly with the remote storage server to upload data to the remote storage service server or download data from the remote storage service server without routing data traffic through the centralized data management server. The data management server initially communicates with a remote storage service server to open an account for a user and obtains an access token for accessing the account in the remote storage service server. The user terminal receives the access token and performs data upload, download or data synchronization operation with the remote storage service server without further involvement of the data management server. In this way, the data traffic to the data management server can be reduced and latency associated with routing data traffic through the data management server can be eliminated.

A remote storage service server herein refers to a computing device operated by a service provider to perform, among other operations, storing of data for one or more users. The service provider may be an entity separate from a user and provide service for free, with a usage fee or a combination of both. Example service providers include, Dropbox, Amazon, ADrive.com, and CloudMe.

An access token herein refers to access information for accessing a remote storage service server. The access token may be generated by the remote storage service server when opening an account. The access token may have a unique and encrypted data value that verifies the identity of a specific user. The access token is used, for example, when logging into the remote storage service server, uploading data to the remote storage service server or downloading data from the remote storage service server.

Architecture of Cloud Storage System

Figure 2:
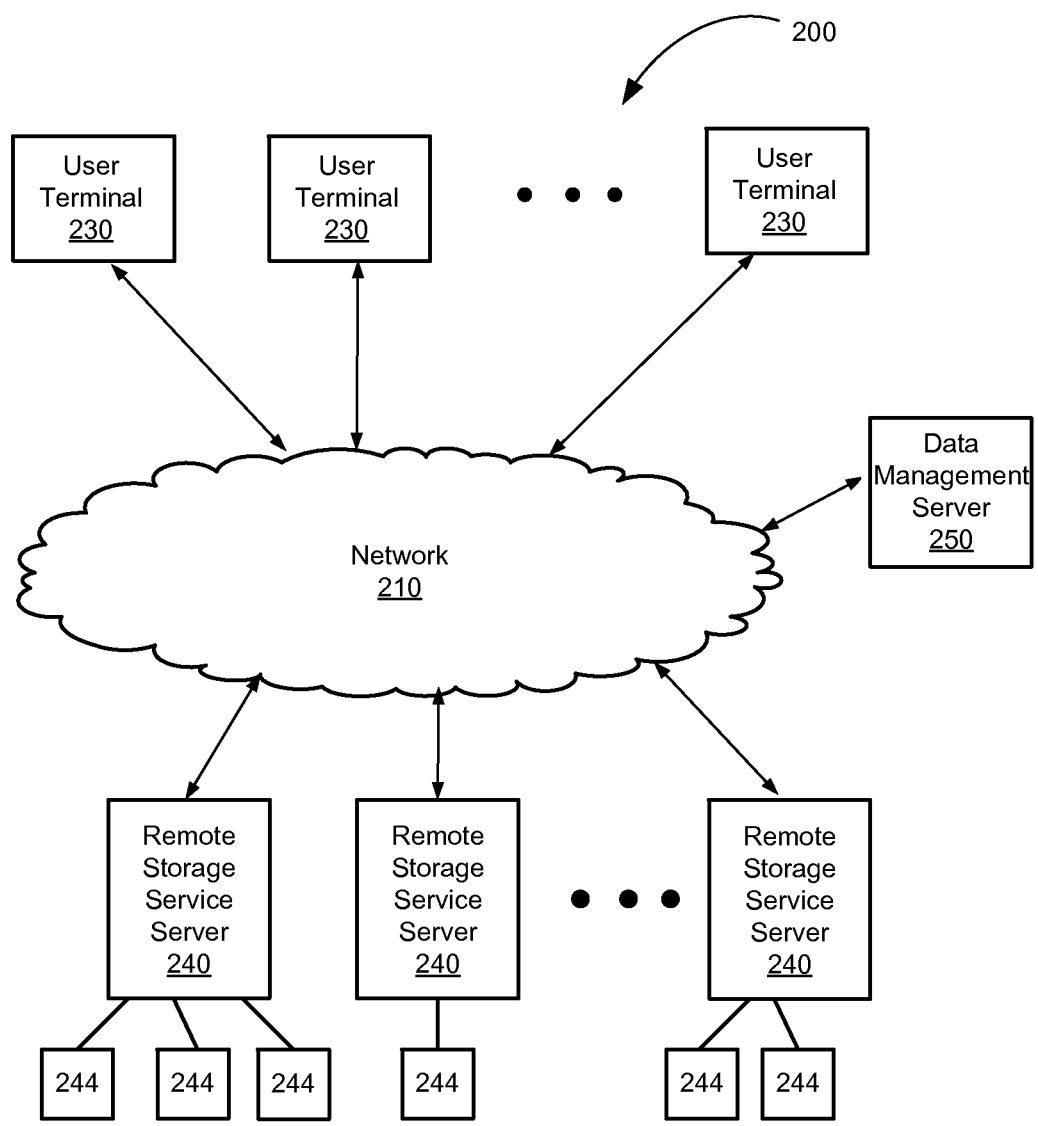
FIG. 2 is a block diagram of a cloud storage system, according to one embodiment.

FIG. 2 is a block diagram illustrating the architecture of a cloud storage system 200, according to one embodiment. The cloud storage system 200 may include, among other components, a network 210, user terminals 230, remote storage service servers 240 and a data management server 250. Each remote storage service server 240 may include or be in communication with one or more storage devices 244. The cloud storage system 200 may include other components not illustrated in FIG. 2 such as application servers for executing various applications for the user terminals 230.

The network 210 allows communication of data between various components of the cloud storage system 200. The network 210 may include multiple processing systems and in one embodiment is a network controller. The network of processing systems may comprise a local area network (LAN), a wide area network (WAN) (e.g., the Internet), and/or any other interconnected data paths across which multiple devices may communicate. The network 210 may use standard network protocols such as TCP/IP, HTTP, HTTPS, and SMTP as well as customized network protocols.

The user terminals 230 are computing devices for performing various computing operations, including uploading or downloading of data to or from the remote storage service servers 240. Each of the user terminals 230 may include components for generating and displaying a graphical user interface elements to interact with the user and a networking component to exchange data with other components of the cloud storage system 200, as described below in detail with reference to FIGS. 3A and 3B. The user terminals 230 may include, but are not limited to, desktop computers, laptop computers, tablet computers, personal digital assistants (PDAs), cell phones, smartphones, game consoles, set-top boxes, and televisions or other appliances with networking capabilities.

The remote storage service server 240 stores various data uploaded by the user terminals 230. Each of the remote storage service server 240 is associated with one or more storage devices 244 for storing data. The storage devices 244 may be included in the remote storage service server 240 or communicate with the remote storage service server 240 through network connection. The remote storage service server 240 may also perform other operations such as authentication to allow the data management server 250 or the user terminals 230 to access the data stored in the storage devices 244.

The data management server 250 operates as a centralized contact point for multiple remote storage service server 240. For this purpose, the data management server 250 manages access tokens that enable the user terminals 230 to access the remote storage service servers 240. Requests are initiated from the user terminals 230 to create new accounts in remote storage servers 240 or enable access to existing accounts in remote storage servers. After successful authentication of accounts in remote storage servers 240, the data management server 250 receives and persistently stores the access tokens from the authenticated remote storage server 240. The data management server maintains the relationship between the user of the user terminals 230 and the access tokens received during access authentication to the remote storage servers 240. The data management server 250 provides the access tokens to the user terminals 230 thereby enabling direct access of the data from the user terminals 230 to the remote storage servers 240. The data management server 250 maintains an index of the data stored in the connected remote storage servers 240 to facilitate synchronization with local data stored in user terminals 230.

Architecture and Functions of User Terminal

Figure 3A:
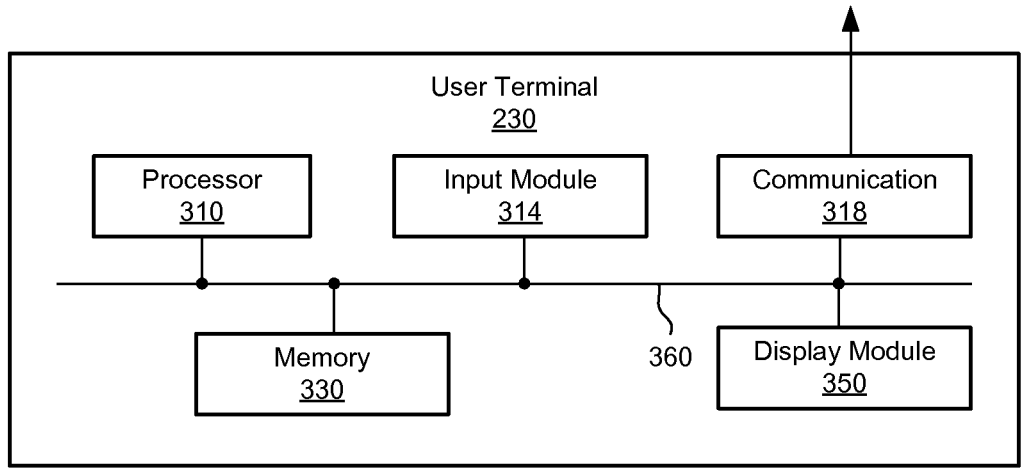
FIG. 3A is a block diagram illustrating components of a user terminal, according to one embodiment.

FIG. 3A is a block diagram of the user terminal 230, according to one embodiment. The user terminal 230 may include, among other components, a processor 310, an input module 314, a communication module 318, a memory 330, a display module 350, and a bus 360 connecting these components. The user terminal 230 may include components such as a speaker not illustrated in FIG. 5. The processor 310 executes computer instructions stored in the memory 330 to perform various operations. The input module 314 is hardware, software, firmware or a combination thereof for receiving user input. The input module 314 may include, for example, one or more of mouse, keyboard, keypad, touchscreen and remote controller. The communication module 318 is hardware, software, firmware or a combination thereof for communicating with other components of the cloud storage system 200 via the network 210. The display module 350 is hardware, software, firmware or a combination thereof for displaying graphical user interface elements. The display module 350 may include, for example, a graphics processing unit, a display driver and a display screen.

Figure 3B:
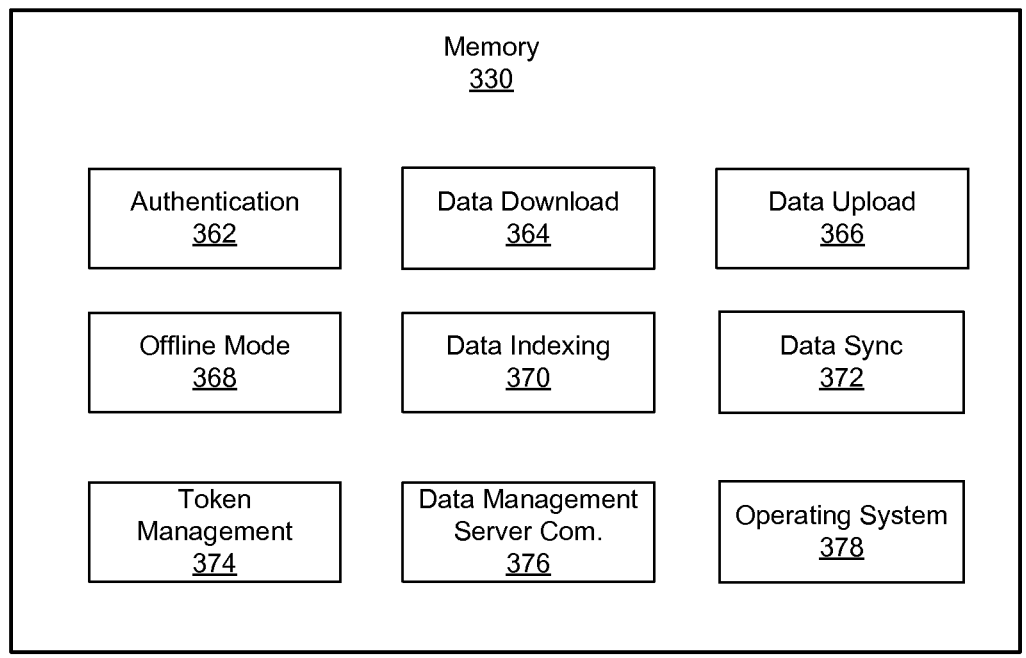
FIG. 3B is a block diagram illustrating software components in a user terminal, according to one embodiment.

FIG. 3B is a block diagram illustrating software components of the user terminal 230, according to one embodiment. The memory 330 stores software components for operating the user terminal 130. The software components in the memory 330 may include, among other components, an authentication module 362, a data download module 364, a data upload module 366, an offline mode module 368, a data indexing module 370, a data synchronization module 372, a token management module 374, a data management server communication module 376 and an operating system 378.

The authentication module 362 is a software component that enables authentication between the user terminal 230 and data management server 250. Various known authentication mechanism (e.g., ID and password combination or digital certificate) may be used for authenticating the user terminal 230.

The data download module 362 is a software component that invokes and processes file data transfer from remote storage service servers 240 to the user terminals 230. The data upload module 366 is a software component that invokes and processes file data transfer from the user terminal 230 to the remote storage service servers 240. For this purpose, the data download module 362 and the data upload 366 use the access tokens managed by the token management 374 module.

The offline mode module 368 is a software component that enables a user to access local data. When the offline mode module 368 is active, the user can perform operations on a local copy of the data without network connection. The updated copy is then uploaded to the remote storage service server 240 after the network connection becomes available . . . .

The data indexing module 370 is a software component that generates and maintains local data index of data stored on the user terminal 230. The local data index may include, among other data, file names, folder locations, file sizes, creation dates, modified dates of local data as well as the locations of corresponding remote data. The local data index is sent to the data management server 250 for comparison with remote data index to generate synchronization information, as described below in detail with reference to FIG. 4.

The data synchronization module 372 is a software component that performs synchronization operation based on the synchronization information received from the data management server 250. The data synchronization module 372 determines data to be uploaded or downloaded based on the synchronization information and invokes the data download module 364 and/or the data upload module 366 to transfer data to or from the remote storage service servers 240.

The token management module 374 is a software component that retrieves access tokens for accessing accounts in the remote storage service servers 240 from the data management server 250. In one embodiment, the token management module 374 deletes an access token after an event such as losing a network connection, termination of the data synchronization operation or elapse of a predetermined time. In one embodiment, the access token is stored in a volatile memory device (e.g., Random Access Memory (RAM)) but not in the non-volatile memory device (e.g., hard drive) of the user terminal 230 so that the access token is removed from the user terminal 230 after the user terminal 230 is rebooted or turned off. By preventing persistent storage of the access tokens in the user terminals 230, unauthorized access to remote data in the remote storage service server 240 can be prevented, thereby enhancing the security of the data stored in the remote storage service server 240.

The data management server communication module 376 is a software component that handles connectivity and data transfer to or from the user terminals 230 via the network 210. The data management server communication module 376 performs, among other operations, establishing a communication session with the data management server 250, invoking authentication module 362 to authenticate the user terminal 230, and maintaining a log history for communication with the data management server 250.

The operating system 378 manages and allocates resources of the user terminal 230 to various operations.

In one embodiment, the user terminal 230 may delete data when the user terminal 230 receives instructions from the data management server 250 to wipe the data. The wipe instruction may be approved by a user by accessing the data management server 250, for example, when a user terminal is stolen. When the wipe instruction is active, the user terminal 230 deletes the stored data when the user terminal 230 logs into the data management server 250.

Architecture and Functions of Data Management Server

Figure 4:
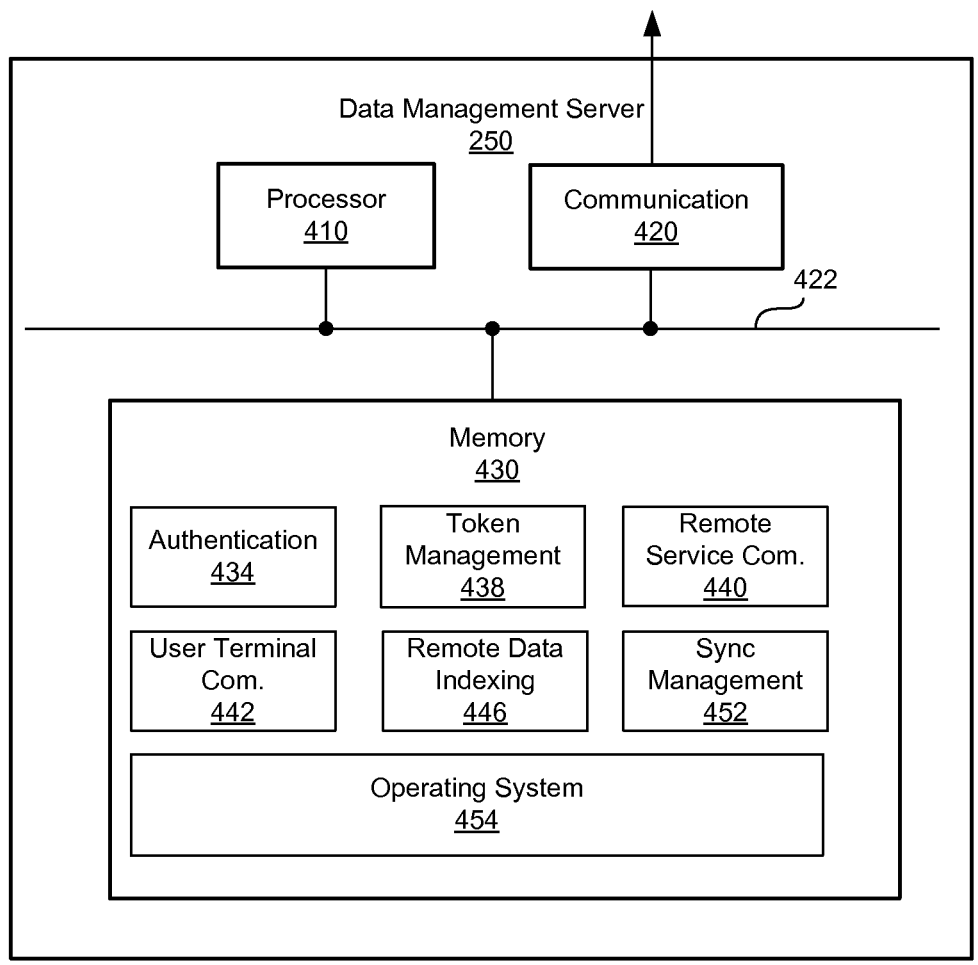
FIG. 4 is a block diagram illustrating components of a data management server, according to one embodiment.

FIG. 4 is a block diagram illustrating the data management server 250, according to one embodiment. The data management server 250 may include, among other components, a processor 410, a communication module 420 (e.g., network interface card), memory 430 and a bus 422 connecting these components. The processor 410 executes computer instructions stored in the memory 430 to perform various operations. The communication module 420 is hardware, software, firmware or a combination thereof for communicating with the user terminals 230 and the remote storage service server 240.

The memory 430 stores various software modules including, among others, an authentication module 434, a token management module 438, a remote service communication module 440, a user terminal communication module 442, a remote data indexing module 446, a synchronization management module 452 and an operating system 454. The memory 430 may store other modules not illustrated in FIG.

4 such as a user management module that maintains the list of authorized users allowed to communicate with the data management server 250.

The authentication module 434 is a software component that enables authentication operations between the user terminals 230 and the data management server 250.

The token management module 438 is a software component that maintains and manages persistent storage of access tokens associated with accounts of the remote storage service server 240. The token management module 438 also performs operations to open accounts in the remote storage service server 240 in response to receiving requests from the user terminals 230.

The remote storage service communication module 440 is a software component that processes authentication requests to the remote storage service servers 240. Based on the authentication, the token management module 438 can open accounts in the remote storage service servers 240 and retrieve access tokens from the remote storage service servers 240. Various known authentication mechanism (e.g., ID and password combination or digital certificate) may be used for authenticating data management server 250.

The user terminal communication module 442 is a software component for performing communication operations with the user terminals 230 including, for example, setting up communication sessions with the user terminal 230.

The remote data indexing module 446 is a software component for generating and maintaining index information of data (i.e., remote data index) stored in remote storage service servers 240. For this purpose, the data management server 250 receives metadata of data or files stores in the accounts of the remote storage service servers 250. The remote data indexing module 446 processes the received metadata into remote data index. The remote data index may include, among other information, file names, folder locations, file sizes, creation dates, modified dates, and stored locations.

The synchronization management module 452 is a software component for performing operations to synchronize data locally stored in the user terminals 230 and data remotely stored in the remote storage service servers 250. Specifically, the synchronization management module 452 receives metadata for data for a user uploaded to the remote storage service servers 250 and generates remote data index for the user. Further, the synchronization management module 452 receives the local data index for data stored locally in the user terminals 230. The synchronization management module 452 compares the remote data index and the local data index to identify differences. If there are any differences (e.g., file size or file updated date) in the remote data index and the local data index, the synchronization management module 452 generates the synchronization information identifying such differences. The synchronization information is then sent to the user terminals 230 so that the user terminals 230 can upload or download data directly to and from the remote storage servers 240 indicated as being different in the remote data index and the local data index.

The operating system 454 is a software component for managing various resources available on the data management server 250.

Example Process of Synchronizing Data

Figure 5:
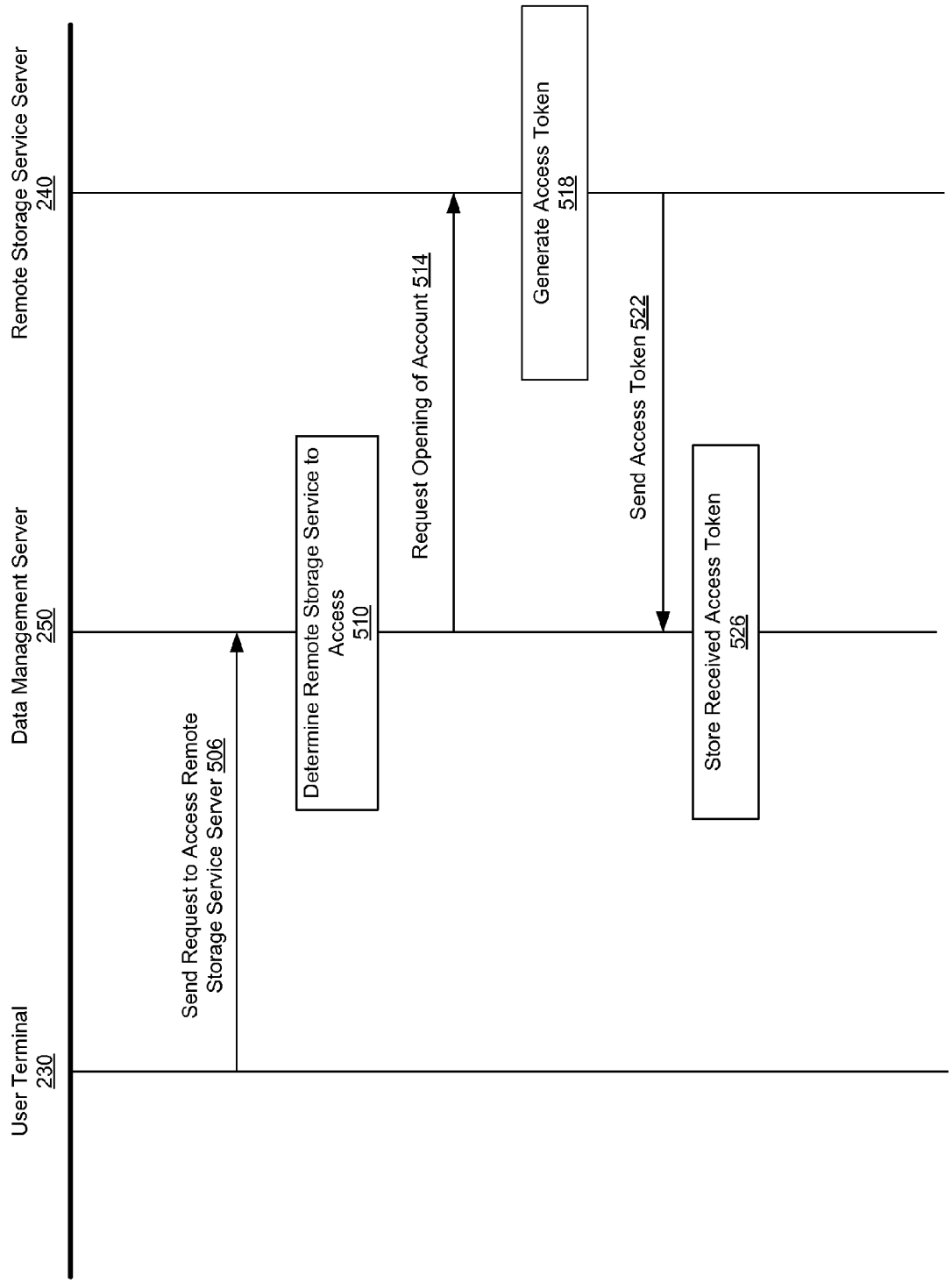
FIG. 5 is an interaction diagram illustrating operation of establishing an account in a remote storage service server, according to one embodiment.

FIG. 5 is an interaction diagram illustrating operation of establishing an account in the remote storage service server 240, according to one embodiment. After authenticating and confirming the user, the user terminal 230 sends 506 a request to access remote storage service server 240. The request is, for example, in the form of instructions to provision memory space to store data in the remote storage service server 240.

In response to receiving the request, the data management server 250 determines 510 a remote storage service to be accessed or used. The process of determining 510 includes selecting which remote storage service to be used based on, for example, the user's preference, the size of memory space to be provisioned, whether the user already opened an account in certain remote storage service, and the conditions for using the remote storage service server 240. Alternatively, the user may preselect remote storage service to be used. In this case, the step of determining 510 the remote storage service may be omitted.

After the remote storage service is determined, the data management server 250 requests 514 that an account be opened in the remote storage service server 240. The process of requesting 514 opening of the account may include providing user names and other information associated with the user to the remote storage service server 240.

Based on the information provided by the data management server 250, the remote storage service server 240 opens an account for the user and generates 518 an access token to be used for accessing the account. If the user has preselected an existing account with the remote storage server 240, the access token for the preselected account is generated 518 at the remote storage server 240. Each account may be allocated with memory space of a predetermined size. The remote storage service server 240 sends the generated access token 522 to the data management server 250.

The data management server 250 stores 526 the received access token for later retrieval by the user terminal 230, as described below in detail with reference to FIG. 6.

Figure 6:
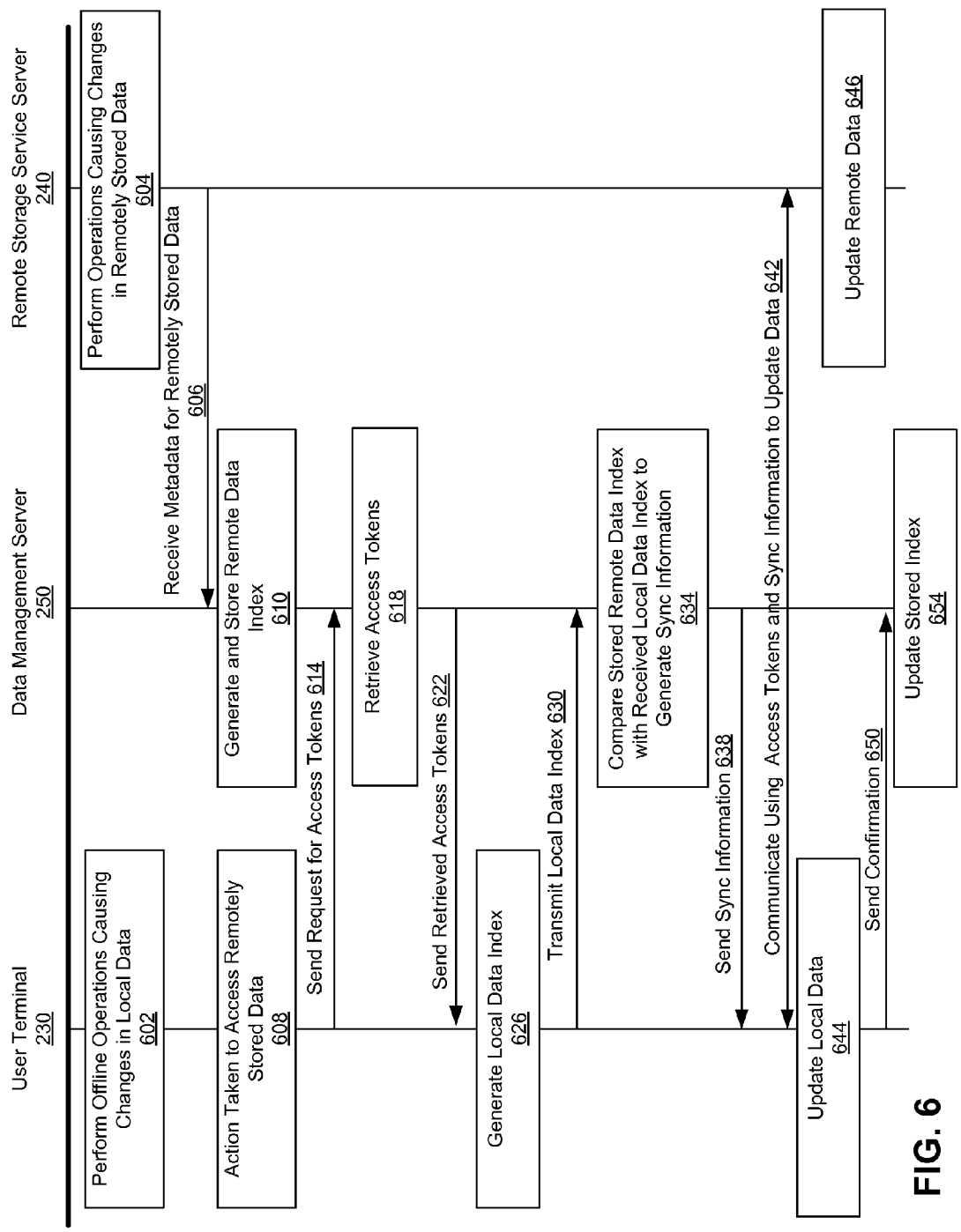
FIG. 6 is an interaction diagram illustrating the process of synchronizing data in a user terminal and the remote storage service server, according to one embodiment.

FIG. 6 is an interaction diagram illustrating the process of synchronizing data in the user terminal 230 and the remote storage service server 240, according to one embodiment. The user terminal 230 may authenticate and confirm a user allowed to access the user terminal 230, the data management user 250 and remote storage service server 240. The user terminal 230 may perform 602 offline operations that cause changes in local data. The user may also access a different online user terminal to perform 604 operations that cause changes in data remotely stored in the remote storage service server 240. After changes in the remotely stored data are performed, the data management server 250 may receive 606 metadata for the remotely stored data. Although FIG. 6 illustrates as receiving the metadata from a single remote storage service server 240, the data management server 250 may receive metadata from multiple remote storage service server 240 if the user opened accounts in multiple remote storage services.

The received metadata may include, among other information, the names or other identification information for remotely stored data, the locations where the data are stored, the times when the data were created, and the times when the data were previously updated.

The data management server 250 then generates and stores 610 the remote data index based on the received metadata. During the generation of the remote data index, the data management server 250 may compile metadata received from multiple remote storage service servers 240 of different remote storage services if the user opened accounts in multiple remote storage services.

When a user takes 608 action to access remotely stored data (e.g., instructions to save or read remotely stored data), the user terminal 230 sends 614 a request for access tokens to the data management server 250. In response, the data management server 250 retrieves 618 one or more access tokens for the user of the requesting user terminal 230 previously stored in the data management server 250, as described above in detail with reference to FIG. 5.

The retrieved access tokens are then sent 622 to the user terminal 230. The user terminal 230 can communicate with the remote storage service server 240 using the retrieved access token corresponding to the remote storage service server 240.

To perform synchronization of data stored in the user terminal 230 and the remote storage service server 240, the user terminal 230 generates 626 a local data index. The generated local data index is then transmitted 630 to the data management server 250.

The data management server 250 then compares 634 the stored remote data index and the local data index to generate the synchronization information. The synchronization information indicates data to be updated on the user terminal and the remote storage service server 240. The data management server 250 then sends 638 the synchronization information to the user terminal 230.

Based on the synchronization information, the user terminal 230 communicates 642 with the remote storage service server 240 to upload or download data. The user terminal 230 directly communicates with the remote storage service server 240 using the access token corresponding to the remote storage service server 240 without routing the data via the data management server 250. Therefore, the synchronization operation of the user terminal 230 advantageously does not consume the processing or network bandwidth of the data management server 250. Further, the latency associated with the operations on the data management server 250 can be removed or reduced. In one embodiment, the synchronization information indicates which of the local data and the remote data is more recent so that the older version of the data may be updated with a newer version of the data.

That is, based on the communication between the user terminal 230 and the remote storage service server 240 and the synchronization information, the user terminal 230 may update 644 some or entire local data using the data received from the remote storage service server 240. The remote storage service server 240 may also update 646 some or entire remote data using the data received from the user terminal 230.

After the remote storage service server 240 and/or the user terminal 230 updates the data, the user terminal 230 sends confirmation 650 to the data management server 250 indicating that the data were synchronized. Further, the data management server 250 updates 654 the stored local data index and/or remote data index to reflect the changes made to the local data and/or the remote data.

The processes and their sequences as illustrated in FIG. 6 are merely illustrative. Various modifications may be made to the processes and the sequences. For example, the process of comparing stored remote data index with the received local data index may be performed at the user terminal 230 instead of the data management server 250. Also, the process of generating 626 the local data index may be performed before sending 614 request for the access tokens.

Ubiquitous Access to Stored Data

In one embodiment, the data management server 250 maintains the remote data index. Hence, a user may access the remotely stored data by accessing the virtual storage service 250 at any on-line locations using different user terminals 230. As long as the user provides valid authentication information to the data management server 250, the user can receive the access tokens and retrieve data remotely stored in remote storage service servers 240.

The authentication information may be, for example, a digital certificate that can be carried in a portable storage device (e.g., Universal Serial Bus (USB) flash drive). The user can access the data management server using the digital certificate at any locations and retrieve the user's data from the remote storage service servers 240. The user can perform various operations on the retrieved data, and upload the updated data individually or through a synchronization process.

ALTERNATIVE EMBODIMENTS

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method, comprising:
    at a data management computing device, receiving encrypted data values for a plurality of users generated and received from a plurality of storage computing devices that are operated by at least one service provider via a network, an encrypted data value representing information to authorize a user to write data to an account in the storage computing devices or read data from the account in the storage computing devices;
    at the data management computing device, storing the received encrypted data values in the data management computing device, the plurality of users located remotely from the plurality of storage computing devices;
    at the data management computing device, receiving a request to access at least a subset of the plurality of storage computing devices from the user via the network;
    at the data management computing device, retrieving a stored encrypted data value corresponding to an account of the user responsive to receiving the request; and sending the retrieved encrypted data value to a user terminal of the user via the network to cause the user terminal to:
store the encrypted data value in a volatile memory device of the user terminal but not in a non-volatile memory device of the user terminal, and
perform operations based on the stored encrypted data value to authorize the user terminal of the user to send data for storing directly to at least the subset of the plurality of storage computing devices or receive data for retrieval directly from at least the subset of the plurality of storage computing devices using the encrypted data value without passing the data for storing or the data for retrieval through the data management computing device.

2. The method of claim 1, further comprising:
sending information of the user of the plurality of storage computing devices by the data management computing device to open the account.

3. The method of claim 1, further comprising:
at the data management computing device, receiving a local data index representing metadata of first data stored in the user terminal of the user;
at the data management computing device, generating a remote data index representing metadata of second data of the user stored in the plurality of storage computing devices; and
at the data management computing device, comparing the local data index and the remote data index to generate synchronization information identifying differences in the first data and the second data, the user terminal communicating with the plurality of the storage computing devices to update the first data or the second data.

4. The method of claim 3, further comprising:
receiving confirmation from the user terminal indicating conclusion of the updating of the first data or the second data; and
updating the local data index in the data management computing device responsive to receiving the confirmation.

5. The method of claim 1, wherein the request is received from the user responsive to the user logging into a data management service provided by the data management computing device.

6. The method of claim 1, further sending instructions to delete data in the user terminal responsive to receiving a wipe instruction from the user.

7. A data management computing device, comprising:
a token management module comprising a processor and a memory coupled to the processor, the memory storing instructions causing the processor to:
receive encrypted data values for a plurality of users generated and received from a plurality of storage computing devices that are operated by at least one service provider via a network, the plurality of users located remotely from the plurality of storage computing devices, an encrypted data value representing information to authorize a user to write data to an account in the storage computing device or read data from the account in the storage computing devices;
store the received encrypted data values in the data management computing device; and
retrieve a stored encrypted data value corresponding to an account of the user responsive to receiving a request to access at least a subset of the plurality of storage computing devices from the user; and a user terminal communication module comprising the processor and the memory coupled to the processor, the memory storing instructions causing the processor to:
receive the request to access at least the subset of the plurality of storage computing devices from the user via the network; and
send the retrieved encrypted data value to a user terminal of the user via the network to cause the user terminal to:
store the encrypted data value in a volatile memory device of the user terminal but not in a non-volatile memory device of the user terminal, and
perform operations based on the stored encrypted data value to authorize the user terminal of the user to send data for storing directly to at least the subset of the plurality of storage computing devices or receive data for retrieval directly from at least the subset of the plurality of storage computing devices using the encrypted data value without passing the data for storing or the data for retrieval through the data management computing device.

8. The data management computing device of claim 7, further comprising a remote service communication module comprising the processor and the memory coupled to the processor, the memory further comprising instructions causing the processor to:
send information of the user to each of the plurality of storage computing devices by the data management computing device to open the account.

9. The data management computing device of claim 7, further comprising a synchronization management module, the synchronization management module comprising the processor and the memory, the memory storing instructions causing the processor to compare a local data index and a remote data index to generate synchronization information identifying differences in the first data and the second data, the local data index representing metadata of first data stored in the user terminal of the user, and the remote data index representing metadata of second data of the user stored in the plurality of storage computing devices, the synchronization information sent to the user terminal to perform synchronization operation with the plurality of storage computing devices.

10. The data management computing device of claim 7, wherein the user terminal communication module further comprises the processor and the memory coupled to the processor, the memory storing further instructions causing the processor to receive confirmation from the user terminal indicating conclusion of the updating of the first data or the second data, and the synchronization management module is further configured to update the local data index in the data management computing device server responsive to receiving the confirmation.

11. The data management computing device of claim 7, wherein the request is received from the user responsive to the user logging into a data management service provided by the data management computing device.

12. The data management computing device of claim 7, wherein the user terminal communication module is further configured to send instructions to delete data in the user terminal responsive to receiving a wipe instruction from the user.

13. A non-transitory computer-readable storage medium storing instructions thereon, the instructions when executed by a processor in a data management computing device, cause the processor to:

receive encrypted data values for a plurality of users generated and received from a plurality of storage computing devices that are operated by at least one service provider via a network, an encrypted data value representing information to authorize a user to write data to an account in the storage computing devices or read data from the account in the storage computing devices;

store the received encrypted data values in the data management computing device, the plurality of users located remotely from the plurality of storage computing devices;

receive a request to access at least a subset of the plurality of storage computing devices from the user via the network;

retrieve a stored encrypted data value corresponding to an account of the user responsive to receiving the request; and send the retrieved encrypted data value to a user terminal of the user via the network to cause the user terminal to:
  store the encrypted data value in a volatile memory device of the user terminal but not in a non-volatile memory device of the user terminal, and
  perform operations based on the stored encrypted data value to authorize the user terminal of the user to send data for storing directly to at least the subset of the plurality of storage computing devices or receive data for retrieval directly from at least the subset of the plurality of storage computing devices using the encrypted data value without passing the data for storing or the data for retrieval through the data management computing device.

14. The method of claim 3, wherein the differences comprise at least one of file size and file updated data of the first data and the second data.

15. The method of claim 1, further comprising:
determining which of the plurality of storage computing devices to store the data based on preference of the user, responsive to receiving the request.

16. The method of claim 1, further comprising:
determining which of the plurality of storage computing devices to store the data based on which of the plurality of storage computing devices has an account previously opened for the user, responsive to receiving the request.

17. The method of claim 1, further comprising:
determining which of the plurality of storage computing devices to store the data based on conditions for using the each of the plurality of storage computing devices, responsive to receiving the request.

18. The method of claim 1, wherein a plurality of storage computing devices are operated by a plurality of service providers.

* * * * *